Aug. 23, 1938. A. F. ROTH 2,127,532
ANTISKID DEVICE
Filed April 9, 1936
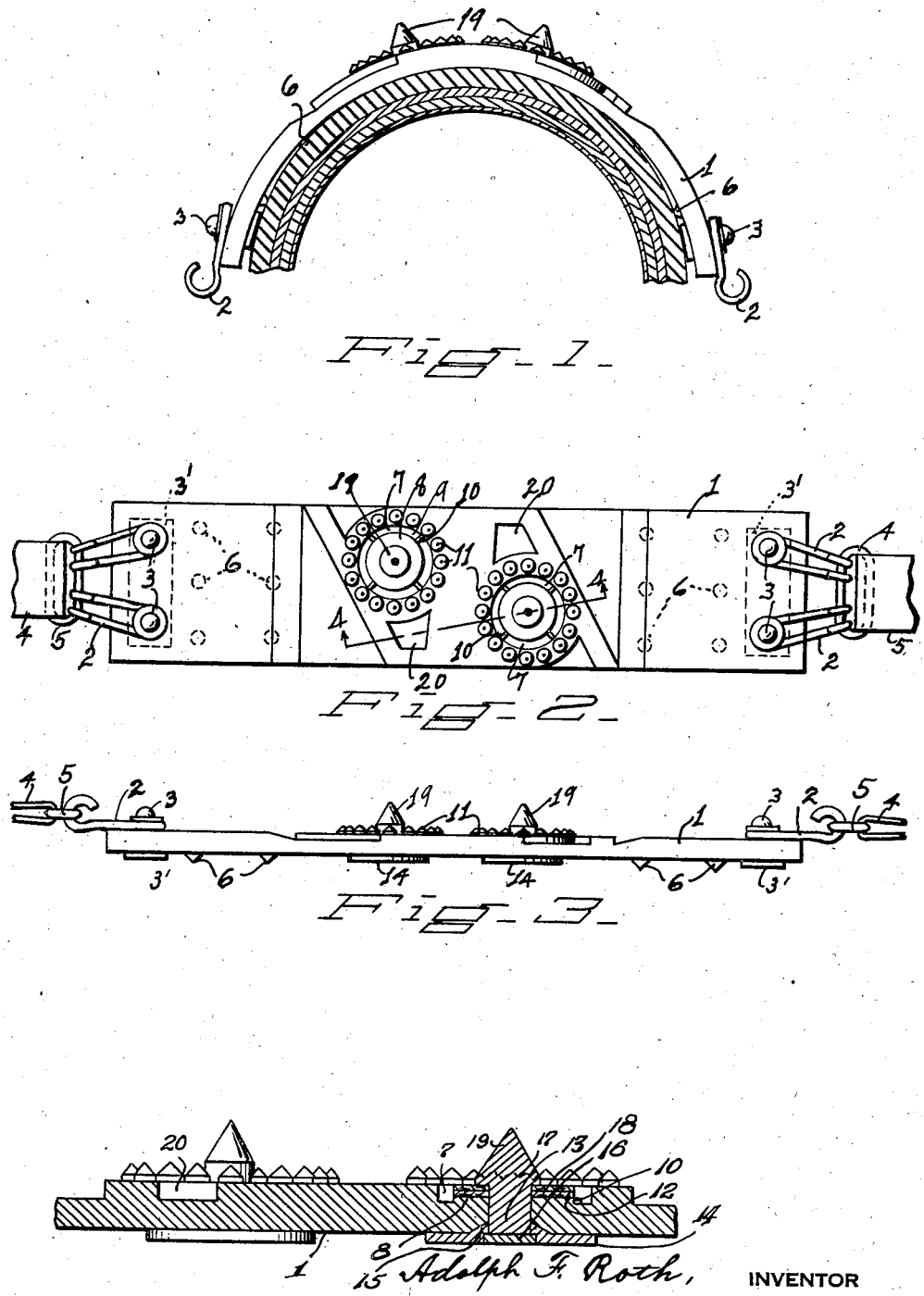
Adolph F. Roth, INVENTOR
BY Gifford, Scull & Burgess, ATTORNEYS Patented Aug. 23, 1938

2,127,532

UNITED STATES PATENT OFFICE 2,127,532

ANTISKID DEVICE

Adolph F. Roth, Wilkes-Barre, Pa.

Application April 9, 1936, Serial No. 73,446

8 Claims. (Cl. 152—222)

This invention relates to an anti-skid device which can be attached transversely to an automobile tire. Generally, a plurality of the devices will be used upon such wheel and may be attached thereto by straps at the ends thereof passing around, below and between the spokes, or by having circular chains on each side of the wheel near the rim to which the ends of the straps of the anti-skid devices are attached.

The invention will be understood from the description in connection with the accompanying drawing, in which Fig. 1 is a view of a tire, showing one of the devices applied thereto; Fig. 2 is a plan view of the anti-skid device; Fig. 3 is an edge view of the same; and Fig. 4 is a section along the line 4—4 of Fig. 2.

In the drawing, reference character 1 indicates a strip of flexible material which is preferably made up of a plurality of alternating plies of fabric or metal screens and rubber. Metal screens of brass, copper or steel, for example, of mesh varying from about 20 to 80 have been found to be satisfactory, and increase the lasting qualities and make the riveting more secure. The plies are preferably made up and the rubber afterwards vulcanized with rubber layers on both sides of the device, so that the fabric is protected from the weather. Fastening means 2 are riveted by the rivets 3 on opposite ends of the strap 1, the ends of the strap being thickened, as indicated at 4, for strengthening it where the rivets are attached. Metal strips 3' lie under the rivet heads to keep them from pulling out. Straps 4 may be attached by links 5 to the fastening means 2.

Integral projections 6 of rubber that may be conically shaped are provided on the inner or tire side of the strap 1 to take the wear on that side, as the strap bears against the tire.

Circular recesses 7 are provided on the road side of the strap 1 with bosses 8 in these recesses of smaller size than the recesses. These bosses 8 terminate below the outer or road surface of the strap 1 and an annular channel 9 is left between the boss 8 and the wall of the recess 7. Radially extending ribs 10 extend from the boss 8 to the wall of the recess 7 and a row of integral rubber projections 11, preferably of conical shape, is provided around each recess 7 to take some of the wear and protect the rubber near the recess. A layer 12 of fabric is applied to the end of each boss 8.

A rivet 13 extends through each boss 8 and a washer 14 having an inwardly bent or concave portion 15 at the hole in the washer keeps each rivet 13 in place as the end 16 of each rivet is riveted over the washer. The depression or concavity in the washer gives space for the riveted end of the rivet, so that an almost smooth surface lies against the tire, thus avoiding injuring the tire. Each rivet is provided with a head 17 and a washer 18. The washers are placed between the heads 17 of the rivets 13 and the fabric 12 on the bosses.

Hardened metal 19 is welded to the head 17 of each rivet so as to assume a conical or somewhat pointed shape. This specially hardened metal may be that of well-known alloys with extraordinarily high abrasive resistance, so that they will wear a very long time, even in contact with hard road surfaces.

Recesses 20 may be provided on the road side of the strap 1 to lend greater flexibility and also to aid in preventing skidding.

In applying the wear resisting points 19 to the strap they are welded to the rivets 13 and the rivets are passed through the holes in the bosses 8, the washers 14 are applied and the ends of the rivets are upset or riveted to spread into concavities 15 of the washers, thereby providing an approximately smooth surface that does not project much from the inner side of the strap 1.

The edges of the washers 14 extend to the circular recesses 7 around the bosses, so that when the rivets 13 are forced to the side, the edges of the washers do not cut the material of the flexible strap. Also, the ribs 10 in the recesses 7 lend strength and aid in keeping the rivets 13 from being forced too much out of normal positions when lateral tension or force is applied to the the projections 19.

I claim:

1. An anti-skid device comprising a plurality of plies of fabric and rubber, rivets extending through said plies, washers attached to said rivets on the tire side of said device, recesses on the road side of said device, bosses in said recess through which said rivets pass, said bosses being of smaller size than said recesses and terminating short of the road surface of said device said rivets having pointed ends extending beyond the road surface of said device.

2. An anti-skid device comprising a plurality of plies of fabric and rubber, rivets extending through said plies, washers attached to said rivets on the tire side of said device, extensions of hardened metal wear-resisting material welded to the outer ends of said rivets and extending beyond the outer surface of said plies, recesses on the road side of said device, and a plurality of projections around said recesses.

3. An anti-skid device of flexible material having projections of rubber on opposite sides thereof, the projections on the road side thereof surrounding recesses in said flexible material, and rivets extending through said flexible material having hardened wear-resisting metal of pointed shape extending beyond the outer surface of said flexible material.

4. An anti-skid device of flexible material having projections of rubber on opposite sides thereof, the projections on the road side thereof surrounding recesses in said flexible material, and bosses in said recesses.

5. An anti-skid device of flexible material having recesses on one side thereof, bosses in said recesses, and hardened metal wear resisting material on said bosses having points extending beyond the outer surface of said device.

6. An anti-skid device of flexible material having recesses on one side thereof, bosses in said recesses, hardened metal wear resisting material on said bosses having points extending beyond the outer surface of said device, and washers between said metal material and bosses.

7. An anti-skid device of flexible material having recesses on one side thereof, bosses in said recesses, hardened metal wear resisting material on said bosses having points extending beyond the outer surface of said device, and rivets to which said metal material is welded extending through said bosses and flexible material.

8. An anti-skid device of flexible material having recesses on one side thereof, bosses in said recesses, hardened metal wear resisting material on said bosses having points extending beyond the outer surface of said device, rivets to which said metal material is welded extending through said bosses and flexible material, and fabric interposed between said bosses and metal material.

ADOLPH F. ROTH.